United States Patent [19]

Hert

[11] Patent Number: 4,623,581

[45] Date of Patent: Nov. 18, 1986

[54] COMPOSITIONS OF ETHYLENE POLYMERS FOR THE MANUFACTURE OF FILMS

[75] Inventor: Marius Hert, Aubigny en Artois, France

[73] Assignee: Societe Chimique des Charbonnages S.A., France

[21] Appl. No.: 500,956

[22] Filed: Jun. 3, 1983

[30] Foreign Application Priority Data

Jun. 3, 1982 [FR] France ................................. 82 09633

[51] Int. Cl.$^4$ ...................... C08L 23/06; C08L 23/08; C08L 23/20
[52] U.S. Cl. .................................... 428/220; 525/240; 525/227; 525/185; 525/207
[58] Field of Search ............... 525/240, 222, 185, 207, 525/227; 428/220

[56] References Cited

U.S. PATENT DOCUMENTS

| | | | |
|---|---|---|---|
| 3,682,767 | 8/1972 | Britton et al. ......................... | 525/227 |
| 4,243,619 | 1/1981 | Fraser et al. ......................... | 260/40.6 |
| 4,339,507 | 7/1982 | Kurtz et al. .......................... | 428/522 |
| 4,425,268 | 1/1984 | Cooper ................................. | 524/110 |
| 4,429,079 | 1/1984 | Shibata et al. ....................... | 525/240 |

FOREIGN PATENT DOCUMENTS 2077273 12/1981 United Kingdom .

Primary Examiner—Carman J. Seccuro
Attorney, Agent, or Firm—Finnegan, Henderson, Farabow, Garrett & Dunner

[57] ABSTRACT

A composition comprising from 2 to 25 weight percent of at least one free radical ethylene polymer with a specific gravity between 0.91 and 0.94, and from 75 to 98 weight percent of at least one copolymer of ethylene and at least one α-olefin containing at least 4 carbon atoms, with a specific gravity between 0.905 and 0.940 and a melt index between 0.4 and 3 dg/minute, wherein the average proportion of α-olefin units in the copolymer is between 1 and 8 mole percent, wherein the copolymer comprises crystalline fractions and amorphous fractions, wherein the distribution of the α-olefin units in the copolymer is heterogeneous, and wherein the proportion of α-olefin units in the copolymer varies between at least 0.2 and at most 5 times the average proportion, depending on the fractions considered. Application to the manufacture of films with a thickness of between 5 and 200 microns.

8 Claims, No Drawings

COMPOSITIONS OF ETHYLENE POLYMERS FOR THE MANUFACTURE OF FILMS

BACKGROUND OF THE INVENTION

The present invention relates to compositions comprising free radical polyethylene and ethylene/α-olefin copolymers and also to the application of the compositions to the manufacture of films.

Compositions of free radical polyethylene (obtained by a high pressure process) and ethylene/α-olefin copolymers (obtained by a low pressure process) are already known. For example, European Patent Application No. 0,006,110 describes films, with a thickness between 5 and 500 microns, extruded from compositions comprising from 1 to 20 weight percent free radical polyethylene with a melt index between 0.2 and 5 dg/minute and from 80 to 99 weight percent ethylene/α-olefin copolymer with a specific gravity between 0.912 and 0.940, a melt index between 0.1 and 5 dg/minute, a polydispersity index (defined by the ratio Mw/Mn of the weight average molecular weight to the number-average molecular weight) between 2.7 and 4.1, and an overall degree of unsaturation of between 0.1 and 0.3 double bonds per 1,000 carbon atoms. The copolymer that forms part of these compositions is manufactured by a low pressure (10 to 70 bars) and low temperature (30° C. to 115° C.) process. Copolymers of this type have a perfectly homogeneous structure, as described in French Pat. No. 1,604,980. French Pat. No. 2,481,709 describes a mixture of: (a) 30 to 80 weight percent of an ethylene/α-olefin copolymer, the α-olefin having from 3 to 12 carbon atoms, and the copolymer having a specific gravity of less than 0.945 and an intrinsic viscosity at 135° C. of 1.7 to 10 dl/g; and (b) 20 to 70 weight percent high pressure polyethylene having a specific gravity between 0.915 and 0.935 and an intrinsic viscosity at 135° C. less than 1.3 dl/g. For an ethylene/α-olefin copolymer of this type, an intrisic viscosity at 135° C. of more than 1.7 dl/g corresponds to a melt index (according to ASTM Standard Specification D 1238-73) of less than 0.3 dg/minute.

U.S. Pat. No. 3,176,052 describes a homogeneous mixture comprising: (a) from 5 to 75 weight percent free radical polyethylene having a specific gravity of 0.91 to 0.94; and (b) from 25 to 95 weight percent ethylene/α-olefin copolymer having a specific gravity greater than 0.92 and a melt index between 0.1 and 10 dg/minute. The patent teaches that the improvement in the gloss of an extruded film obtained from a mixture of this type, compared with the extruded films obtained from each constituent of the mixture, is more pronounced with a higher melt index of free radical polyethylene (3 to 10 dg/minute according to the examples) and with a lower melt index of the ethylene/α-olefin copolymer compared with the free radical polyethylene (from 0.5 to 1.4 dg/minute according to the examples).

Films extruded from free radical polyethylene having a thickness generally equal to at least 20 microns are also known.

SUMMARY OF INVENTION

An object of the invention is to provide a composition for use in the manufacture of films.

Another object of the invention is to provide films made from the compositions of the invention that have improved properties when compared with films made from the constituent parts of the compositions of the invention, while avoiding the limitations of other films in the art.

Additional objects and advantages of the invention will be set forth in part in the description that follows, and in part will be obvious from the description, or may be learned by practice of the invention. The objects and advantages of the invention may be realized and attained by means of the combinations particularly pointed out in the appended claims.

To achieve the foregoing objects and in accordance with the purpose of the invention, as broadly described herein, the invention encompasses: a composition comprising from 2 to 25 weight percent of at least one free radical ethylene polymer with a specific gravity between 0.91 and 0.94, and from 75 to 98 weight percent of at least one copolymer of ethylene and at least one α-olefin containing at least four carbon atoms, with a specific gravity between 0.905 and 0.940 and a melt index between 0.4 and 3 dg/minute, wherein the average proportion of α-olefin units in the copolymer is between 1 and 8 mole percent, wherein the copolymer comprises crystalline fractions and amorphous fractions, wherein the distribution of the α-olefin units in the copolymer is heterogeneous, and wherein the proportion of α-olefin units in the copolymer varies between at least 0.2 and at most 5 times the average proportion depending on the fractions considered.

DESCRIPTION OF THE PREFERRED EMBODIMENTS

Reference will now be made to the presently preferred embodiments of the invention.

It has been found advantageous to prepare compositions comprising from 2 to 25 weight percent free radical polyethylene and from 75 to 98 weight percent ethylene/α-olefin copolymer having a particular heterogeneous structure. Compositions of this type permit manufacture of films that have a thickness less than or equal to 20 microns. Certain properties of these films are improved compared with films made from each of the two constituents of the mixture, while at the same time the limitations of the prior art are avoided. For example, the ethylene/α-olefin copolymer of the composition does not need to have a polydispersity index of between 2.7 and 4.1, nor does the copolymer need an overall degree of unsaturation of between 0.1 and 0.3 double bonds per 1,000 carbon atoms. Similarly, the ethylene/α-olefin copolymer of the composition does not need to have, as in French Pat. No. 2,481,709, a melt index of less than 0.3 dg/minute. Such an index is generally difficult to obtain by the majority of the known copolymerization processes.

The copolymers of the invention are of special structure, as described in European Patent Application No. 0,070,220, which corresponds to French Pat. No. 2,509,315 and have crystalline fractions with a melting peak between 118° C. and 130° C. The crystalline fractions represent from 20 to 50 weight percent of the total copolymer. They also have an overall degree of unsaturation between 0.25 and 0.50 double bonds per 1,000 carbon atoms, and preferably between 0.32 and 0.45 double bonds per 1,000 carbon atoms. In the remainder of the description, the term "copolymers" will be used to denote either binary polymers containing one α-olefin in addition to ethylene, or ternary polymers containing two α-olefins in addition to the ethylene. The copolymers used in the invention have an average molecular weight between 15,000 and 60,000 and/or a polydispersity index between 3 and 9 for the binary polymers or between 4 and 12 for the ternary polymers. In the above definition, as is conventional in polymer technology, the average molecular weight means the number-average molecular weight, Mn, and the polydispersity index is the ratio Mw/Mn, the weight-average molecular weight divided by the number average molecular weight. The α-olefins which can form part of the heterogeneous copolymers used in the invention include, for example, but-1-ene, hex-1-ene, 4-methylpent-1-ene and oct-1-ene. If two α-olefins are present simultaneously in the copolymer used in the invention, as in the case of a terpolymer, their total average proportion is between 1 and 8 mole percent, as described above, and the ratio of the respective average proportions of the α-olefins is preferably between 0.25 and 4. Thus, for example, an ethylene/but-1-ene/hex-1-ene terpolymer according to the invention, comprising 95 mole percent ethylene units, may comprise on average from 1 to 4 mole percent but-1-ene units and on average from 4 to 1 mole percent hex-1-ene units.

The process of the invention for producing copolymers consists in copolymerizing ethylene and the alpha-olefins with at least 4 C atoms in at least one reactor comprising at least one zone at a temperature between 180° and 320° C. and at a pressure between 300 and 2,500 bars, by means of a Ziegler type catalytic system comprising on one hand a activator selected from the hydrides and the organo-metallic compounds of the groups I through III of the periodic table, and on the other hand at least one halogenated compound of a transition metal, characterized in that on one hand the gas flow feeding the reactor consists in the stationary state of 35 to 80% by weight of ethylene and of 20 to 65% by weight of alpha-olefin, and on the other hand that the catalytic system is far more reactive toward the ethylene, preferably 5 to 15 times more reactive, than to the alpha-olefin. In an illustrative example implying no limitation, such a compound is of the formula

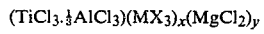

$(TiCl_3 \cdot \frac{1}{3}AlCl_3)(MX_3)_x(MgCl_2)_y$ where $0.3 \leq x \leq 3$, $0 \leq y \leq 20$, M is a transition metal of the VB and VIB groups of the periodic table and X is a halogen. These catalysts have a binary solid solution structure Ti—M which can be characterized by the dimension of its crystallites. It was found with respect to the effectiveness of these catalysts that this dimension determined by radiocrystallographic analysis (Sherrer's law) in the direction perpendicular to the (300) plane preferably must be equal to or less than 100 angstroms (Å). As can been seen in the light of their formula, these catalysts for $y>0$ can be fastened on an inert support consisting of a halide of anhydrous magnesium. Among the metals M, vanadium and chromium are preferred, but molybdenum and tungsten can also be used. The halogen of the magnesium halide and that of the M metal halide can be identical or different and are selected from fluorine, chlorine, bromine and iodide.

A production process of such compounds consists in putting syn-crystallized titanium trichloride in contact with aluminum chloride, the M metal halide and possibly the anhydrous magnesium halide, for a sufficiently long time that the crystallite dimension (determined as above) of the solid solution be less than 100 Å. This can be efficiently done by subjecting the three above chlorides to a grinding stage wherein the grinding power would be at least 3 kwh per kg of treated solid. More specifically, it has been found that the effectiveness of these compounds is the higher the larger this grinding power. However, in order to optimize this effectiveness taking into account the operational costs and the need to save energy, the grinding energy as a rule need not exceed 25 kwh per kg of solid.

The proportions of the activator and of transition-metal halide compound are so selected that the atomic ratio of activator metal to transition metal (in the case above to the sum Ti+M) be within 1 to 10. The mean dwell time of the catalytic system in the polymerization reactor as a rule is between 2 and 100 seconds. This dwell time depends on the temperature in the reactor in the sense that it will be longer the lower the temperature. The preferred activators on one hand are trialkyl aluminums and on the other hand the alkyl-siloxalanes such as those described in the U.S. Pat. No. 3,969,332.

The composition of the gas flow feeding the reactor when in its stationary mode as characterized in the process of the invention must be understood to be an average composition over the whole reactor, this composition of course not necessarily being uniform and possibly varying along the reactor, in particular when the reactor comprises several zones. This composition varies with the nature of alpha-olefin being considered. Thus the percentage by weight of this alpha-olefin in this gas flow preferably is between 15 and 40% for butene-1 and between 35 and 65% for hexene-1.

The process of the invention is implemented in continuous manner using autoclave or tubular reactors in the conventional manner for polymerizing ethylene under high pressure. In order to precisely control the fluidity coefficient of the copolymer, the polymerization can be advantageously carried out in the presence of up to 2% moles of hydrogen.

In terms of the present invention, a free radical ethylene polymer means a product obtained by the polymerization, under high pressure (generally 1,000 to 4,000 bars) at a high temperature (140° C. to 350° C.), in the presence of a free radical initiator (such as oxygen, peroxides, or peresters), of ethylene and, if appropriate, at least one monomer copolymerizable with the ethylene, such as, for example, carbon monoxide, ethylenically unsaturated carboxylic acids, esters derived from the acids and from an alcohol having from 1 to 8 carbon atoms, maleic anhydride, vinyl acetate and other known monomers. Free radical polymers which are particularly suitable for the present invention are ethylene homopolymers and ethylene copolymers comprising up to 25 weight percent of at least one alkylacrylate, the alkyl group having from 1 to 8 carbon atoms. A free radical ethylene polymer having a melt index between 0.25 and 4 dg/minute is also preferred.

The two types of polymers that form the basic combination of the invention are very readily miscible to form homogeneous mixtures. The compositions of the invention can therefore be prepared without difficulty by any polymer mixing techniques, in particular mixing of granules in the solid state at ambient temperature and mixing in the molten state under the action of heat.

Another aspect of the present invention is a film with a thickness of between 5 and 200 microns, obtained from a composition such as described above. The film of the invention has certain properties which are improved compared with films made from each constitent polymer of the mixture. These films are distinguished, in particular, by the impact resistance, the hot strength of the welds, the optical haze, the tensile properties (ultimate tensile strength and elongation at break) and the tear strengh. However, in contrast to the teaching of U.S. Pat. No. 3,176,052 mentioned above, the optical gloss of the films of the invention is not superior to, but inferior to that of films obtained from each polymer of the mixture. This situation is not disadvantageous since the gloss of the ethylene/α-olefin copolymers of heterogeneous structure used in the present invention is greatly superior to that of the copolymers described in U.S. Pat. No. 3,176,052.

The films of the invention are obtained from the compositions of the invention by the well-known techniques of blow extrusion or of extrusion through a flat die. They have numerous applications in the packaging industry, in particular in freezer bags for foodstuffs.

The examples which follow illustrate some embodiments and advantages of the invention but do not imply any limitation on the scope of the invention.

EXAMPLES 1 TO 4

Films are made by blow extruding compositions comprising:

(A) an ethylene/but-1-ene copolymer with a melt index (measured according to ASTM Standard Specification D 1238-73) of 0.8 dg/minute, a density (measured according to French Standard Specification T 51-063) of 0.919 g/cm$^3$, a number-average molecular weight (measured by gel permeation chromatography) of 43,000, a polydispersity index, Mw/Mn, of 3.6, an overall degree of unsaturation of 0.39 double bonds per 1,000 carbon atoms and a melting point of the crystalline fraction (determined by differential thermal analysis) of 122° C. The heterogeneity of the distribution of the but-1-ene (determined by a copolymer fractionation test) is expressed by the multiple, 2.2 times, and the sub-multiple, 0.5 times, of the average proportion between which the proportion of but-1-ene units varies, depending on the fractions considered. This copolymer is obtained according to the procedure of Example 5 of European Patent Application No. 0,070,220.

(B) an ethylene homopolymer, obtained in the presence of a free radical initiator, with a density of 0.921 g/cm$^3$ and a melt index of 1.1 dg/minute.

The conversion conditions are as follows:
temperature of the composition: 200° C.
speed of rotation of the extrusion screw: 80 rpm
swelling ratio: 3.0.

In addition to the proportion by weight of copolymer (A) in the composition, Table 1 shows the results of the measurements, carried out on 50 micron thick films, of the following properties:

ultimate tensile strength in the longitudinal direction, UTSL (expressed in kg/cm$^2$) and elongation at break in the transverse direction, EBT (expressed in %), both determined according to ASTM Standard Specification D 882-67, and hot strength of the welds, HSW (expressed in g/mm), determined according to TAPPI Standard Specification T 683 SU 72.

The same table also shows, for each composition, the limit of industrial stretchability (IS), expressed in microns, the smallest thickness which allows continuous manufacture of the film tube to be maintained, without breakage, for a period of 2 hours.

TABLE I

| Example | (A) % | UTSL | EBT | HSW | IS |
|---|---|---|---|---|---|
| 1 | 100 | 210 | 710 | 15.5 | 8 |
| 2 | 90 | 210 | 700 | 21.0 | 9 |
| 3 | 75 | 210 | 680 | 22.5 | 11 |
| 4 | 0 | 150 | 415 | 1.5 | 30 |

Examples 1 and 4 are obviously comparative examples. The values of the tensile properties and the hot strength of the welds for the compositions according to the invention are unexpectedly greater than the arithmetic mean of the values of the properties of each of the pure polymers which they comprise. The industrial stretchability of the compositions of the invention is less than the arithmetic mean of the industrial stretchability of each of the pure polymers which they comprise.

EXAMPLES 5 TO 7

The following films are produced by blow extrusion from compositions comprising:

(A) the heterogeneous copolymer used in the previous examples, and (B) an ethylene homopolymer, obtained in the presence of a free radical initiator, with a density of 0.923 g/cm$^3$ and a melt index of 0.3 dg/minute.

The conversion conditions are the same as in the previous examples except for the temperature of the composition which is 205° C.

In addition to the weight percent of the copolymer (A) in the composition and the industrial stretchability, IS, Table II shows the results of the measurements, carried out on 50 micron thick films, of the properties measured previously and also of the optical haze H (expressed in %) (according to ASTM Standard Specification D 1003) and the optical gloss, G (expressed in %) (according to ASTM Standard Specification D 2457).

TABLE II

| Example | (A) % | UTSL | EBT | HSW | H | IS | G |
|---|---|---|---|---|---|---|---|
| 5 | 90 | 210 | 690 | 15.5 | 7.4 | 12 | 92 |
| 6 | 75 | 210 | 655 | 17.5 | 10.0 | 12 | 79 |
| 7 | 0 | 180 | 300 | 2 |  | 90 | 48 |

By way of comparison, a film of the same thickness, obtained under the same conditions, from pure copolymer (A) has a haze, H, of 10.5% and a gloss, G, of 99%.

EXAMPLES 8 TO 10

Films are produced by blow extrusion from compositions comprising:

(A) the heterogeneous copolymer used in the previous examples, and (B) an ethylene homopolymer, obtained in the presence of a free radical initiator, with a density of 0.924 g/cm$^3$ and a melt index of 2 dg/minute.

The conversion temperatures are the same as previous examples, except for the temperature of the composition which is 170° C.

In addition to the weight percent of copolymer (A) in the composition and the industrial stretchability, IS, Table III shows the results of the measurements, on 50 micron thick films, of the properties measured previously and also the impact resistance, IR, (expressed in g/μ), determined according to ASTM Standard Specification D 1709-67.

TABLE III

| Example | (A) | HSW | H | IR | IS | G |
| --- | --- | --- | --- | --- | --- | --- |
| 8 | 90 | 15.5 | 7.7 | 3.0 | 8 | 95.5 |
| 9 | 75 | 15 | 6.7 | 2.9 | 9 | 92.5 |
| 10 | 0 | 2.5 | 6.0 | 1.9 | 20 | 99.0 |

By way of comparison, it is specified that the pure copolymer (A) has an impact resistance of 3.0 g/μ.

EXAMPLES 11 TO 14

Compositions comprising the following are converted to films by blow extrusion:

(A) an ethylene/but-1-ene copolymer similar to that used in the previous examples, except for its melt index (equal to 0.9 dg/minute) and its density (equal to 0.930 g/cm$^3$), and (E) an ethylene/butyl acrylate copolymer comprising 17.5% by weight of acrylate and having a melt index of 1.7 dg/minute and a density of 0.925 g/cm$^3$.

The conversion conditions are as follows:
temperature of the composition: 250° C.
speed of rotation of the extrusion screw: 60 rpm
swelling ratio: 3.0

In addition to the proportion by weight of the copolymer (A) in the composition, TABLE IV below shows the ultimate tensile strength in the longitudinal direction, UTSL, the elongation at break in the transverse direction, EBT, and also the tear strength in the longitudinal direction, TSL, and in the transverse direction, TST (expressed in grams), determined according to ASTM Standard Specification D 1922-67.

TABLE IV

| Example | (A) % | UTSL | EBT | TSL | TST |
| --- | --- | --- | --- | --- | --- |
| 11 | 100 | 253 | 867 | 135 | 269 |
| 12 | 95 | 257 | 938 | 141 | 381 |
| 13 | 90 | 260 | 902 | 182 | 440 |
| 14 | 80 | | | 257 | 565 |

It will be apparent to those skilled in the art that various modifications can be made in the composition of the invention without departing from the scope or spirit of the invention.

What is claimed is:

1. A composition comprising (a) from 2 to less than 25 weight percent of at least one free radical ethylene polymer with a specific gravity between 0.91 and 0.94, and a melt index of at least 0.3 dg/min. and not more than 2 dg/min., the free radical ethylene polymer being obtained by polymerization under high pressure and high temperature conditions, and (b) from 75 to 98 weight percent of at least one copolymer of ethylene and at least one α-olefin containing at least 4 carbon atoms, with a specific gravity between 0.905 and 0.940 and a melt index between 0.4 and 3 dg/minute, the average proportion of α-olefin units in the copolymer being between 1 and 8 mole percent, the copolymer comprising crystalline fractions and amorphous fractions, wherein said crystalline fractions of said copolymer have a single melting peak between 118° C. and 130° C. and represent from 20 to 50 weight percent of the total copolymer, the copolymer having a polydispersity index of between about 3 and about 9 for binary polymers and between about 4 and about 12 for ternary polymers;

wherein the distribution of the α-olefin units in the copolymer is heterogeneous and wherein the proportion of α-olefin units in the copolymer varies between at least 0.2 and at most 5 times the average proportion, depending on the fractions considered.

2. The composition of claim 1, wherein said ethylene/α-olefin copolymer has a molecular weight of between 15,000 and 60,000.

3. The composition of claim 1, wherein said copolymer contains two α-olefins, and wherein the respective average proportions of said α-olefins are in a ratio between 0.25 and 4.

4. The composition of claim 1, wherein all of said α-olefins are selected from the group consisting of but-1-ene, hex-1-ene, 4-methylpent-1-ene and oct-1-ene.

5. The composition of claim 1, wherein said free radical ethylene polymer is a copolymer of ethylene and at least one comonomer selected from the group consisting of carbon monoxide, ethylenically unsaturated carboxylic acids, esters derived from said acids and from alcohol having 1 to 8 carbon atoms, maleic anhydride, and vinyl acetate.

6. The composition of claim 5, wherein said free radical ethylene polymer is an ethylene copolymer comprising up to 25 weight percent at least one alkyl acrylate, said alkyl group having from 1 to 8 carbon atoms.

7. The composition of claim 1, wherein the overall degree of unsaturation of the ethylene/α-olefin copolymer is between 0.25 and 0.50 double bonds per 1,000 carbon atoms.

8. A film having a thickness of between about 5 and 200 microns made from the composition of claim 1.

* * * * *